US010292085B2

(12) United States Patent
Wang et al.

(10) Patent No.: US 10,292,085 B2
(45) Date of Patent: May 14, 2019

(54) NETWORK CONFIGURATION METHOD AND APPARATUS AND SYSTEM (71) Applicant: FUJITSU CONNECTED TECHNOLOGIES LIMITED, Kawasaki-shi, Kanagawa (JP)

(72) Inventors: Weiwei Wang, Beijing (CN); Ningjuan Chang, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 83 days.

(21) Appl. No.: 15/012,118

(22) Filed: Feb. 1, 2016

(65) Prior Publication Data
US 2016/0150458 A1 May 26, 2016

Related U.S. Application Data (63) Continuation of application No. PCT/CN2013/080845, filed on Aug. 5, 2013.

(51) Int. Cl.
*H04W 8/26* (2009.01)
*H04W 36/00* (2009.01)
(Continued)

(52) U.S. Cl.
CPC ....... *H04W 36/38* (2013.01); *H04W 36/0055* (2013.01); *H04W 36/0069* (2018.08);
(Continued)

(58) Field of Classification Search
None
See application file for complete search history.

(56) References Cited

U.S. PATENT DOCUMENTS 8,842,616 B2  9/2014 Cheng et al.
2007/0066344 A1  3/2007 Pi et al.
(Continued)

FOREIGN PATENT DOCUMENTS

CN  101873675 A  10/2010
CN  102256309 A  11/2011
(Continued)

OTHER PUBLICATIONS

Second Office Action issued by Rospatent Federal Service for Intellectual Property for corresponding Russian Patent Application No. 2016107467/07(011781), dated Nov. 17, 2017, with an English translation.
(Continued)

*Primary Examiner* — Jutai Kao
(74) *Attorney, Agent, or Firm* — Myers Wolin, LLC (57) ABSTRACT A network configuration method and apparatus and a system, the network configuration method includes: receiving, by a target primary eNB of user equipment, a handover request message transmitted by a source primary eNB of the user equipment, the handover request message containing identification indication information or service indication information of the user equipment in a serving eNB before handover; and transmitting, by the target primary eNB of the user equipment, the identification indication information or the service indication information to a target secondary eNB of the user equipment, so that the target secondary eNB performs resource configuration for services of the user equipment according to the identification indication information or the service indication information. With the method, apparatus and system of the embodiments of the present disclosure, waste of resources resulted from repeated reservation of the resources may be avoided.

16 Claims, 5 Drawing Sheets (51) Int. Cl.
*H04W 36/04* (2009.01)
*H04W 36/08* (2009.01)
*H04W 36/38* (2009.01)

(52) U.S. Cl.
CPC ....... *H04W 36/0072* (2013.01); *H04W 36/08* (2013.01); *H04W 8/26* (2013.01); *H04W 36/04* (2013.01)

(56) References Cited

U.S. PATENT DOCUMENTS

| | | |
|---|---|---|
| 2009/0072366 A1 | 3/2009 | Govindaiah et al. |
| 2011/0235603 A1 | 9/2011 | Cheng et al. |
| 2012/0127908 A1 | 5/2012 | Gao |
| 2013/0028216 A1 | 1/2013 | Baldemair et al. |
| 2013/0165122 A1 | 6/2013 | Tanaka |
| 2013/0170474 A1 | 7/2013 | Bi et al. |
| 2013/0182635 A1 | 7/2013 | Zhao et al. |
| 2014/0016565 A1 | 1/2014 | Ode et al. |
| 2014/0112277 A1 | 4/2014 | Yang et al. |
| 2014/0321433 A1 | 10/2014 | Xiao et al. |
| 2014/0362801 A1 | 12/2014 | Morita |
| 2015/0181470 A1* | 6/2015 | Chai ................ H04W 36/0005 455/438 |
| 2016/0044548 A1* | 2/2016 | Choi .................... H04W 36/04 370/331 |
| 2016/0286449 A1* | 9/2016 | Choi .................... H04W 36/28 |

FOREIGN PATENT DOCUMENTS

| | | |
|---|---|---|
| CN | 102695227 A | 9/2012 |
| EP | 2 306 769 A1 | 4/2011 |
| EP | 2 343 919 A2 | 7/2011 |
| EP | 2 343 919 A3 | 8/2014 |
| EP | 2 995 163 B1 | 3/2017 |
| EP | 3 197 220 A2 | 7/2017 |
| JP | 2006-287601 A | 10/2006 |
| KR | 10-2009-0029680 A | 3/2009 |
| KR | 10-2013-0032372 A | 4/2013 |
| RU | 2 479 155 C2 | 12/2012 |
| WO | 2012/132016 A1 | 10/2012 |
| WO | 2014/139626 A1 | 10/2012 |
| WO | 2012/148141 A2 | 11/2012 |
| WO | 2013/004006 A1 | 1/2013 |
| WO | 2013/104269 A1 | 7/2013 |
| WO | 2013/108908 A1 | 7/2013 |
| WO | 2014/182229 A1 | 11/2014 |

OTHER PUBLICATIONS

Notice of Preliminary Rejection issued for corresponding Korean Patent Application No. 10-2016-7003424 dated Oct. 7, 2016 with an English translation.
International Search Report issued for corresponding International Patent Application No. PCT/CN2013/080845, dated May 9, 2014, with an English translation.
Written Opinion of the International Searching Authority for corresponding International Patent Application No. PCT/CN2013/080845, dated May 9, 2014, with an English translation.
3GPP TS 36.300 V11.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2013.
3GPP TS 36.423 V11.4.0, "3rd Generation Partnership Project; Technical Specification Group Radio Access Network; Evolved Universal Terrestrial Radio Access Network (E-UTRAN); X2 application protocol (X2AP) (Release 11)", Mar. 2013.
Office Action issued for corresponding Russian Patent Application No. 2016107467/07(011781) dated Jun. 20, 2017 with an English translation.
Search Report issued for corresponding Russian Patent Application No. 2016107467/07(011781) dated Jun. 20, 2017 with an English translation.
Extended European search report with supplementary European search report and the European search opinion issued by the European Patent Office for corresponding European Patent Application No. 13891316.5 dated Jun. 27, 2017.
Nokia Corporation et al: Change Request for "Introduction of Carrier aggregation enhancements", 3GPP TSG-RAN WG2 Meeting #79, R2-124259, Qingdao, China, Aug. 13-17, 2012.
Office Action issued by the Mexican Institute of Industrial Property for corresponding Mexican Patent Application No. MX/a/2016/001308, dated Apr. 25, 2017, with an English translation.
Invitation pursuant to Rule 62a (1) EPC for corresponding European Patent Application No. 13891316.5 dated Feb. 22, 2017.
Office Action issued by the Canadian Intellectual Property Office for corresponding Canadian Patent Application No. 2,919,307, dated Dec. 21, 2016.
Office Action issued by the Canadian Intellectual Property Office for corresponding Canadian Patent Application No. 2,919,307, dated Oct. 12, 2017.
Office Action issued by the Mexican Institute of Industrial Property for corresponding Mexican Patent Application No. MX/a/2016/001308, dated Dec. 11, 2017, and received Jan. 9, 2018, with an English translation.
First Office Action and search report issued by the Canadian Intellectual Property Office for corresponding Canadian Patent Application No. 2,967,460, dated Mar. 12, 2018, and received by an individual under 37 CFR 1.56(c)(3) on Mar. 28, 2018.
Extended European search report with the European search report or the partial European search report/ declaration of no search and the European search opinion issued by the European Patent Office for corresponding European Patent Application No. 18151584.2, dated May 14, 2018.
Office Action issued by the Canadian Intellectual Property Office for corresponding Canadian Patent Application No. 2,919,307, dated Jun. 4, 2018.
Notification of Reasons for Refusal issued by the Japan Patent Office for corresponding Japanese Patent Application No. 2017-155970, dated May 29, 2018, with an English translation.
Notification of Reasons for Refusal issued by the Japan Patent Office for corresponding Japanese Patent Application No. 2017-155970, dated Nov. 6, 2018, with an English translation.
Decision to Decline the Amendment issued by the Japan Patent Office for corresponding Japanese Patent Application No. 2017-155970, dated Feb. 5, 2019, with an English translation.
Sharp, "Dual Connectivity for Small Cell Enhancements", Agenda Item: 7.2, 3GPP TSG-RAN WG2 Meeting #81, R2-130538, St. Julian's, Malta, Jan. 28-Feb. 1, 2013.

* cited by examiner

501 transmitting, by the source primary eNB of the UE, a handover request message to the target primary eNB of the UE, the handover request message containing identification indication information or service indication information of the UE in a serving eNB before handover

FIG. 5

601 receiving, by a target primary eNB of UE, a handover request message transmitted by a source primary eNB of the UE, the handover request message containing identification indication information or service indication information of the UE in a serving eNB before handover

602 transmitting, by the target primary eNB of the UE, the identification indication information or the service indication information to a target secondary eNB of the UE, so that the target secondary eNB performs resource configuration for services of the UE according to the identification indication information or the service indication information

NETWORK CONFIGURATION METHOD AND APPARATUS AND SYSTEM

CROSS REFERENCE TO RELATED APPLICATIONS

This application is a continuation application of International Application PCT/CN2013/080845 filed on Aug. 5, 2013, the entire contents of which are incorporated herein by reference.

FIELD

The present disclosure relates to the field of communications, and in particular to a network configuration method and apparatus and a system.

BACKGROUND

In Rel. 12 of a long-term evolution advanced (LTE-A) network, inter-node resource aggregation allows an user equipment (UE, abbreviated to a user or a terminal) to be served by at least two eNBs (a primary eNB and a secondary eNB) simultaneously. The primary eNB can add a serving eNB for the UE via the secondary eNB or new cell adding procedure. When an UE is handed over from a source eNB to a target eNB, the target eNB may possibly start the secondary eNB or the new cell adding procedure to add a new serving eNB for the UE, thereby achieving one UE being served by multiple eNBs.

In an existing mechanism, after the UE is handed over from the source eNB to the target eNB, the target eNB does not add a new serving eNB for the UE; however, this is allowed in Rel. 12. In a process of adding a new serving eNB by the target eNB for the UE, the newly-added serving eNB and the source eNB may possibly serve for the UE jointly when the UE is still at the source eNB, or the newly-added serving eNB may further receive a handover request about the UE from the source eNB. Therefore, as for the same service of the same UE, the newly-added serving eNB will receive requests from different eNBs simultaneously, hence, doubled resourced will be reserved for the same service of the same UE, thereby resulting in unnecessary resource reservation, and limiting the ability of the eNBs to serve for the UE.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

An object of embodiments of the present disclosure is to provide a network configuration method and apparatus and a system, so as to achieve one UE being served by multiple eNBs, thereby further avoiding waste of resources resulted from repeated reservation of the resources.

According to a first aspect of the embodiments of the present disclosure, there is provided a network configuration method, including:

receiving, by a target primary eNB of user equipment, a handover request message transmitted by a source primary eNB of the user equipment, the handover request message containing identification indication information or service indication information of the user equipment in a serving eNB before handover; and transmitting, by the target primary eNB of the user equipment, the identification indication information or the service indication information to a target secondary eNB of the user equipment, so that the target secondary eNB performs resource configuration for services of the user equipment according to the identification indication information or the service indication information.

According to a second aspect of the embodiments of the present disclosure, there is provided a network configuration method, including:

receiving, by a target secondary eNB of user equipment, identification indication information or service indication information of the user equipment in a serving eNB before handover transmitted by a target primary eNB of the user equipment; and performing resource configuration for services of the user equipment by the target secondary eNB of the user equipment according to the identification indication information or the service indication information.

According to a third aspect of the embodiments of the present disclosure, there is provided a network configuration method, including:

transmitting, by a source primary eNB of user equipment, a handover request message to a target primary eNB of the user equipment, the handover request message containing identification indication information or service indication information of the user equipment in a serving eNB before handover, so that the target primary eNB forwards the identification indication information or the service indication information to a target secondary eNB of the user equipment, so that the target secondary eNB of the user equipment performs resource configuration for services of the user equipment with reference to the identification indication information or the service indication information.

According to a fourth aspect of the embodiments of the present disclosure, there is provided an eNB, including:

a receiving unit configured to receive a handover request message transmitted by a source primary eNB of user equipment, the handover request message containing identification indication information or service indication information of the user equipment in a serving eNB before handover; and a transmitting unit configured to transmit the identification indication information or the service indication information to a target secondary eNB of the user equipment, so that the target secondary eNB performs resource configuration for services of the user equipment according to the identification indication information or the service indication information.

According to a fifth aspect of the embodiments of the present disclosure, there is provided an eNB, including:

a receiving unit configured to receive identification indication information or service indication information of user equipment in a serving eNB before handover transmitted by a target primary eNB of the user equipment; and a configuring unit configured to perform resource configuration for services of the user equipment according to the identification indication information or the service indication information.

According to a sixth aspect of the embodiments of the present disclosure, there is provided an eNB, including:

a transmitting unit configured to transmit a handover request message to a target primary eNB of user equipment, the handover request message containing identification indication information or service indication information of the user equipment in a serving eNB before handover, so that the target primary eNB forwards the identification indication information or the service indication information to a target secondary eNB of the user equipment, so that the target secondary eNB of the user equipment performs resource configuration for services of the user equipment with reference to the identification indication information or the service indication information.

According to a seventh aspect of the embodiments of the present disclosure, there is provided a network configuration method, including:

generating, by a first serving eNB of user equipment, an identifier of the user equipment in a service mode of multiple eNBs; and transmitting the identifier by the first serving eNB of the user equipment to a second serving eNB of the user equipment.

According to an eighth aspect of the embodiments of the present disclosure, there is provided an eNB, including:

a generating unit configured to generate an identifier of user equipment in a service mode of multiple eNBs; and a transmitting unit configured to transmit the identifier to other serving eNBs of the user equipment.

According to another aspect of the embodiments of the present disclosure, there is provided a communication system, including:

the eNB as described in the fourth aspect, the eNB as described in the fifth aspect, and the eNB as described in the sixth aspect; or two eNBs as described in the eighth aspect.

According to a further aspect of the embodiments of the present disclosure, there is provided a computer-readable program, wherein when the program is executed in an eNB, the program enables a computer to carry out the network configuration method as described in any one of the first to the third aspects and the seventh aspect in the eNB.

According to still another aspect of the embodiments of the present disclosure, there is provided a storage medium in which a computer-readable program is stored, wherein the computer-readable program enables a computer to carry out the network configuration method as described in any one of the first to the third aspects and the seventh aspect in an eNB.

An advantage of the embodiments of the present disclosure exists in that with the method, apparatus and system of the embodiments of the present disclosure, one UE being served by multiple eNBs may be achieved, throughput of the UE is increased, mobility performance is raised, signaling overhead is lowered, and waste of resources resulted from repeated reservation of the resources may further be avoided.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION

The foregoing and other features of the embodiments of the present disclosure shall become apparent with reference to the drawings and the following description. These embodiments are illustrative only, and are not intended to limit the present disclosure. For the principles and implementations of the present disclosure to be easily understood by those skilled in the art, the implementations of the present disclosure shall be described taking network configuration in Rel. 12 of an LTE system as an example. However, it should be understood that the embodiments of the present disclosure are not limited to the above system, and are applicable to other systems related to network configuration and cell handover.

Embodiment 1

Figure 1:
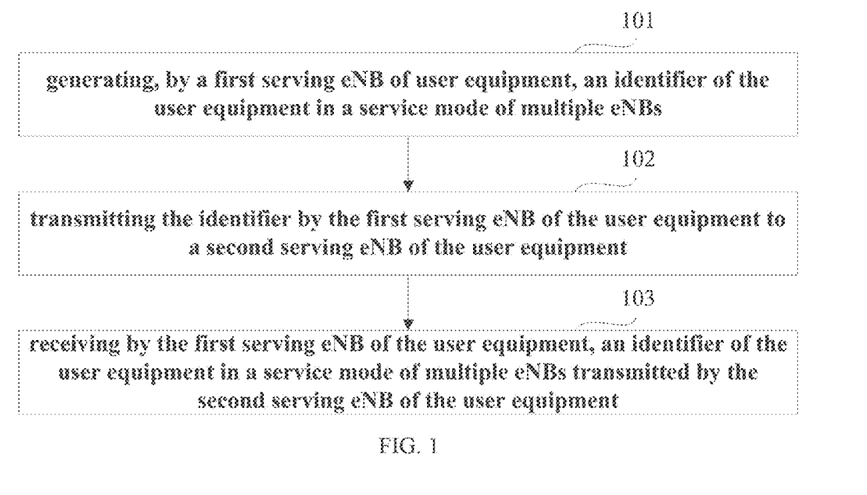
FIG. 1 is a flowchart of an implementation of the network configuration method of an embodiment of the present disclosure.

An embodiment of the present disclosure provides a network configuration method. FIG. 1 is a flowchart of the method. Referring to FIG. 1, the method includes:

step 101: generating, by a first serving eNB of user equipment, an identifier of the user equipment in a service mode of multiple eNBs;

step 102: transmitting the identifier by the first serving eNB of the user equipment to a second serving eNB of the user equipment;

in an implementation, if the second serving eNB also generates an identifier of the user equipment in a service mode of multiple eNBs, the second serving eNB will transmit the generated identifier to the first serving eNB, and the method of this embodiment further includes:

step 103: receiving by the first serving eNB of the user equipment, an identifier of the user equipment in a service mode of multiple eNBs transmitted by the second serving eNB of the user equipment.

In this embodiment, when one UE is served by multiple eNBs simultaneously, the network side will allocate a corresponding identifier, referred to as "an identifier of user equipment in a service mode of multiple eNBs", for the UE; wherein, one of the eNBs is referred to as a first serving eNB, and the other one or more eNBs is/are referred to as a second serving eNB/second serving eNBs. And the identifier will always be used only if the UE is still served by multiple eNBs. In this embodiment, the identifier here may be any one of the following identifiers or a combination thereof:

an identifier of UE;
an identifier of a first serving eNB;
an identifier/identifiers of one or more second serving eNBs;
an identifier of the UE in the first serving eNB; and
an identifier of the UE in the one or more second serving eNBs.

In this embodiment, the identifier of the UE may be a specific identifier of the UE in the service mode of multiple eNBs, and the specific identifier is able to uniquely identify one UE being served by multiple eNBs simultaneously.

In this embodiment, the identifier of the UE in one of the serving eNBs may be a cell radio network temporary identifier (C-RNTI) of the UE in the eNB (TS36.300 v11.5.0), or an identifier of the UE at an X2 interface of the eNB, i.e. eNB UE X2AP ID (TS36.423 v11.4.0), etc.

In this embodiment, an identifier of a serving eNB may be ID of the eNB, and/or an identifier of a cell providing services to the UE in the eNB, such as a physical cell identifier (PCI), and an E-UTRAN cell global identifier (ECGI), etc.

The above types of identifiers are illustrative only; however, the embodiments of the present disclosure are not limited thereto, and any identifiers capable of identifying UE or identifying a serving eNB or identifying that UE is in a serving eNB is covered by the protection scope of the embodiments of the present disclosure.

In this embodiment, an order of executing step 103 and steps 101 and 102 is not limited. In an implementation, steps 101 and 102 may be executed first, and then step 103 is executed; in another implementation, step 103 may be executed first, and then steps 101 and 102 are executed; and in a further implementation, steps 101 and 102 and step 103 may be executed simultaneously.

In this embodiment, when the primary eNB of the UE adds a new serving eNB or adds a new serving cell belonging to a different eNB (referred to as a secondary eNB in this embodiment) for the UE, interaction between respectively generated identifiers may be performed by using the method of this embodiment, thereby achieving one UE being served by multiple eNBs simultaneously and being managed by multiple eNBs jointly.

Figure 2:
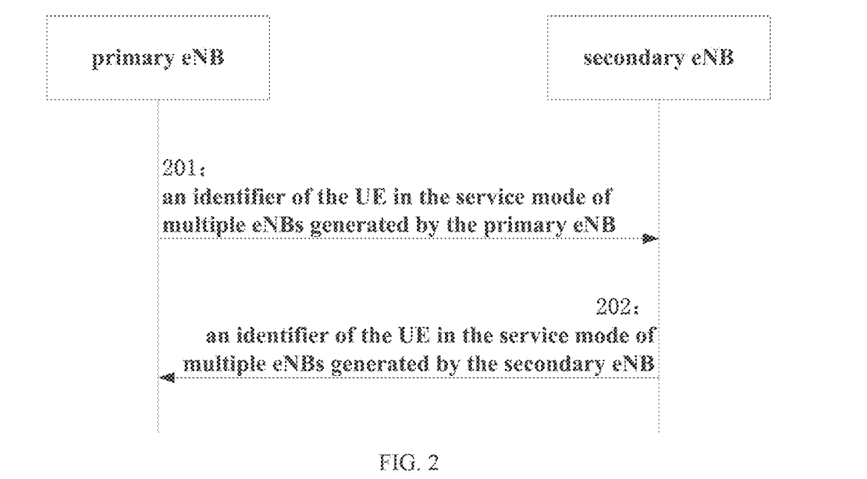
FIG. 2 is a schematic diagram of interaction between eNBs under the network configuration method of the embodiment of the present disclosure.

FIG. 2 is a schematic diagram of interaction of adding a secondary eNB for the UE by the primary eNB of the UE according to the method of this embodiment. Referring to FIG. 2, the process includes:

step 201: transmitting by the primary eNB to the secondary eNB, an identifier of the UE in the service mode of multiple eNBs generated by the primary eNB;

wherein, the above identifier may be carried by an addition request message, and may also be carried by another message, and this embodiment is not limited thereto;

step 202: transmitting by the secondary eNB to the primary eNB, an identifier of the UE in the service mode of multiple eNBs generated by the secondary eNB;

wherein, the above identifier may be carried by an addition request response message, and may also be carried by another message, and this embodiment is not limited thereto.

In this embodiment, forms of the above identifiers have been described above, and shall not be described herein any further. The identifiers may be generated by the primary eNB, generated by the secondary eNB, and may also be generated by the primary eNB and the secondary eNB, respectively.

If the identifiers are generated by the primary eNB, the primary eNB may transmit the identifiers generated by the primary eNB to the secondary eNB via the above addition request message, and the secondary eNB may store the identifiers after receiving them, and manage the UE using the identifiers. At this moment, the secondary eNB may directly transmit an addition request response message to the primary eNB, however the addition request response message containing no information on identifiers; and the secondary eNB may also add the identifiers into the response message to transmit to the primary eNB in transmitting the addition request response message to the primary eNB.

If the identifiers are generated by the secondary eNB, the primary eNB will transmit the addition request message containing no information on identifiers to the secondary eNB; after receiving the message, the secondary eNB may transmit the identifiers generated by the secondary eNB to the primary eNB via the above addition request response message; and the primary eNB will store the identifiers after receiving them, and manage the UE using the identifiers.

If the identifiers are generated by the primary eNB and the secondary eNB, the identifiers generated by the primary eNB will be transmitted to the secondary eNB via the addition request message, and the identifiers generated by the secondary eNB will be transmitted to the primary eNB via the addition request response message. At this moment, after receiving the identifiers generated and transmitted by the primary eNB, the secondary eNB will store the identifiers generated by the primary eNB, then generate the identifiers of the UE in the service mode of multiple eNBs, and transmit the identifiers to the primary eNB via the addition request response message. Alternatively, the addition request response message may further contain the identifiers generated by the primary eNB. After receiving the message, the primary eNB will store the identifiers generated by the secondary eNB, so as to perform subsequent management for the UE using the identifiers.

With the method of this embodiment, both the primary eNB and the secondary eNB of the UE may learn the service state of the UE, so as to provide a reference basis for subsequent resource reservation.

An embodiment of the present disclosure further provides an eNB, as described in Embodiment 2 below. As principles of the eNB for solving problems are similar to that of the method of Embodiment 1, the implementation of the method of Embodiment 1 may be referred to for implementation of the eNB, with identical contents being not going to be described herein any further.

Embodiment 2

Figure 3:
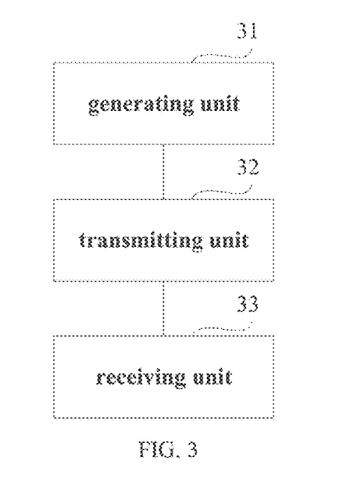
FIG. 3 is a schematic diagram of a structure of the eNB corresponding to the embodiment shown in FIG. 1.

An embodiment of the present disclosure further provides an eNB, FIG. 3 is a schematic diagram of a structure of the eNB. As shown in FIG. 3, the eNB includes:

a generating unit 31 configured to generate an identifier of UE in a service mode of multiple eNBs; and a transmitting unit 32 configured to transmit the identifier to other eNBs.

In an implementation, the eNB further includes:

a receiving unit 33 configured to receive an identifier of the user equipment in a service mode of multiple eNBs transmitted by the other eNBs.

In this embodiment, the identifier of the user equipment in the service mode of multiple eNBs has been described in Embodiment 1, the contents of which being incorporated herein, which shall not be described herein any further.

In this embodiment, the eNB may be a primary eNB serving for the UE, and may also be a secondary eNB serving for the UE.

With the eNB of this embodiment, the primary eNB and the secondary eNB of the UE may learn the service state of the UE, so as to provide a reference basis for subsequent resource reservation.

Embodiment 3

Figure 4A:
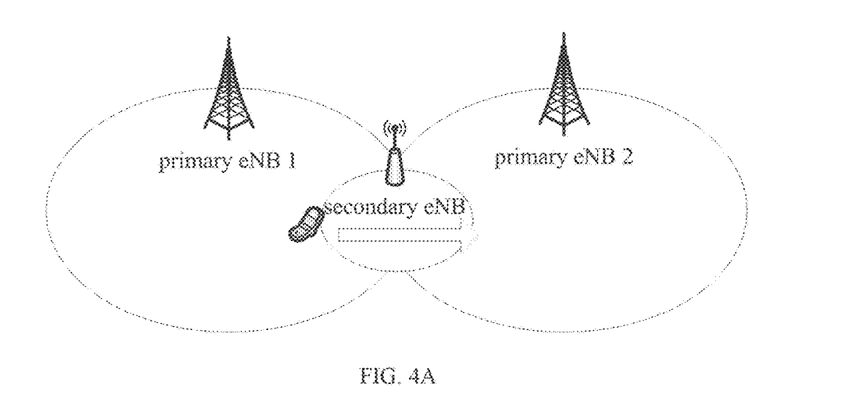
FIGS. 4A-4C are schematic diagrams of several application scenarios under the cell handover method of an embodiment of the present disclosure.
Figure 4B:
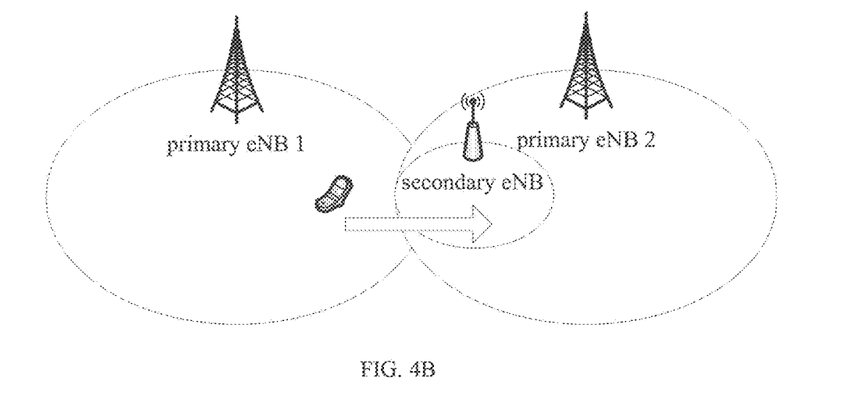
Figure 4C:
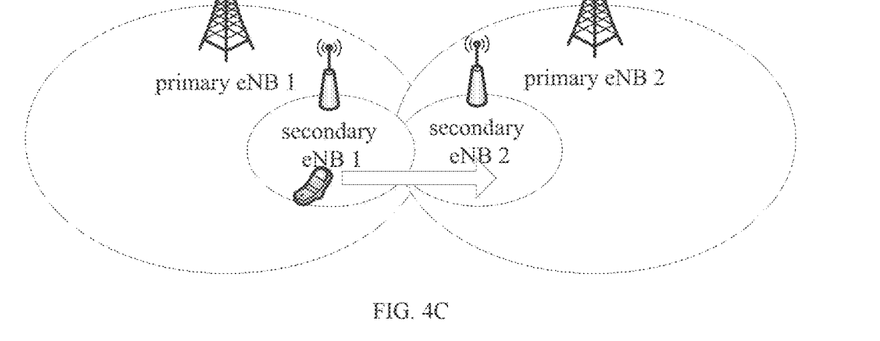

An embodiment of the present disclosure further provides a network configuration method, applicable to scenarios where UE is handed over from a current serving eNB (which is referred to as a source serving eNB, and may include a source primary eNB or a source primary eNB and a source secondary eNB) to other serving eNBs (which are referred to as target serving eNBs, and may include a target primary eNB and a target secondary eNB). FIGS. 4A-4C are schematic diagrams of three of the handover scenarios.

As shown in FIG. 4A, in a primary eNB 1, the UE is served by the primary eNB 1 and a secondary eNB. In this embodiment, this is referred to as that the UE is in a joint service mode of the primary eNB 1 and the secondary eNB. During or after the UE is handed over to a primary eNB 2, the primary eNB 2 adds the secondary eNB to serve for the UE. At this moment, the UE is in a joint service mode of the primary eNB 2 and the secondary eNB. And this handover process may be briefly described as being handed over from the primary eNB 1 and the secondary eNB to the primary eNB 2 and the secondary eNB.

As shown in FIG. 4B, in the primary eNB 1, the UE is served by the primary eNB 1. During or after the UE is handed over to the primary eNB 2, the primary eNB 2 adds a secondary eNB to serve for the UE. At this moment, the UE is in a joint service mode of the primary eNB 2 and the secondary eNB. And this handover process may be briefly described as being handed over from the primary eNB 1 to the primary eNB 2 and the secondary eNB.

As shown in FIG. 4C, in the primary eNB 1, the UE is served by the primary eNB 1 and a secondary eNB 1. In this embodiment, this is referred to as that the UE is in a joint service mode of the primary eNB 1 and the secondary eNB 1. During or after the UE is handed over to the primary eNB 2, the primary eNB 2 adds a secondary eNB 2 to serve for the UE. At this moment, the UE is in a joint service mode of the primary eNB 2 and the secondary eNB 2. And this handover process may be briefly described as being handed over from the primary eNB 1 and the secondary eNB 1 to the primary eNB 2 and the secondary eNB 2.

In the above scenarios, a common feature is that during or after the UE is handed over to the primary eNB 2, the primary eNB 2 adds the secondary eNB (the scenario shown in FIG. 4A or 4B) or the secondary eNB 2 (the scenario shown in FIG. 4C) to serve for the UE. In this way, the secondary eNB would be possible to reserve doubled resources for the same service of the same UE. In order to overcome unnecessary resource reservation, the network configuration method of the embodiment of the present disclosure is proposed.

Figure 5:
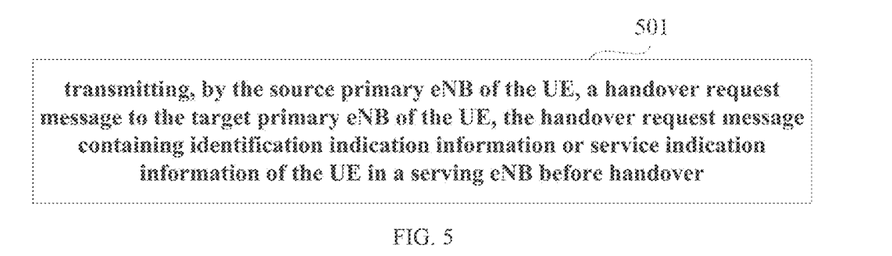
FIG. 5 is a flowchart of an implementation of the network configuration method of an embodiment of the present disclosure.

FIG. 5 is a flowchart of the network configuration method of this embodiment. Referring to FIG. 5, the method includes:

step 501: transmitting, by the source primary eNB of the UE, a handover request message to the target primary eNB of the UE, the handover request message containing identification indication information or service indication information of the UE in a serving eNB before handover, so that the target primary eNB forwards the identification indication information or the service indication information to the target secondary eNB, so that the target secondary eNB performs resource configuration for services of the UE with reference to the identification indication information or the service indication information.

In this embodiment, the serving eNB of the UE before handover may include only one primary eNB (the primary eNB 1 in the scenario shown in FIG. 4B), or may include one primary eNB and one secondary eNB (the primary eNB 1 and the secondary eNB in the scenario shown in FIG. 4A, or the primary eNB 1 and the secondary eNB 1 in the scenario shown in FIG. 4C).

In an implementation of this embodiment, the source primary eNB of the UE transmits the identification indication information of the UE in the serving eNB before handover to the target primary eNB of the UE. In this implementation, the identification indication information of the UE in the serving eNB before handover includes: a specific identifier of the UE (as described in Embodiment 1), and/or an identifier of the UE in the source primary eNB, and/or an identifier of the UE in the source secondary eNB, and/or an identifier of the source primary eNB, and/or an identifier of the source secondary eNB.

Corresponding to the scenario in FIG. 4A, when the primary eNB 1 transmits the handover request message to the primary eNB 2, the identification indication information of the UE in the serving eNB (the primary eNB 1 and the secondary eNB) before handover is transmitted to the primary eNB 2, here the identification indication information may include: an identifier of the UE in the primary eNB 1, and/or an identifier of the UE in the joint service mode of the primary eNB 1 and the secondary eNB, and/or an identifier of the primary eNB 1, and/or an identifier of the secondary eNB.

In this scenario, the identifier of the primary eNB 1 may be an ID of the primary eNB 1, and/or an identifier of a cell providing services to the UE in the primary eNB 1, such as an PCI, an E-UTRAN cell global identifier (ECGI), etc.

Corresponding to the scenario in FIG. 4B, when the primary eNB 1 transmits the handover request message to the primary eNB 2, the identification indication information of the UE in the serving eNB (the primary eNB 1) before handover is transmitted to the primary eNB 2, here the identification indication information may include: an identifier of the UE in the primary eNB 1, and/or an identifier of the primary eNB 1.

In this scenario, the identifier of the primary eNB 1 may be an ID of the primary eNB 1, and/or an identifier of a cell providing services to the UE in the primary eNB 1, such as an PCI, an E-UTRAN cell global identifier (ECGI), etc.

Corresponding to the scenario in FIG. 4C, when the primary eNB 1 transmits the handover request message to the primary eNB 2, the identification indication information of the UE in the serving eNB (the primary eNB 1 and the secondary eNB 1) before handover is transmitted to the primary eNB 2, here the identification indication information may include: an identifier of the UE in the primary eNB 1, and/or an identifier of the UE in the joint service mode of the primary eNB 1 and the secondary eNB 1, and/or an identifier of the primary eNB 1, and/or an identifier of the secondary eNB 1.

In this scenario, an identifier of the eNB (such as the identifier of the primary eNB 1 or the identifier of the secondary eNB 1) may be an ID of the eNB, and/or an identifier of a cell providing services to the UE in the eNB, such as an PCI, an E-UTRAN cell global identifier (ECGI), etc.

In this implementation, the source primary eNB of the UE transmits the identification indication information (identifier) of the UE in the service mode of one or more eNBs before handover to the target primary eNB of the UE, and the target primary eNB forwards the identification indication information to the target secondary eNB of the UE. Hence, the target secondary eNB of the UE may configure a resource for a service requested by the UE with reference to the information. For example, if the target secondary eNB of the UE has provide some services to the UE before the handover of the UE, the target secondary eNB configures no resource for the services any longer after the handover of the UE, thereby avoiding repeated reservation of resources.

In another implementation of this embodiment, it is not the identification indication information but the service indication information of the UE in the serving eNB before handover that is transmitted by the source primary eNB of the UE to the target primary eNB of the UE. In this implementation, the service indication information of the UE in the serving eNB before handover includes services used by the UE and serving eNBs or serving cells to which the services correspond.

In this implementation, the source primary eNB of the UE transmits the service indication information of the UE in the service mode of one or more eNBs before handover to the target primary eNB of the UE, and the target primary eNB forwards the service indication information to the target secondary eNB of the UE. Hence, the target secondary eNB of the UE may configure a resource for a service requested by the UE with reference to the information. For example, if the target secondary eNB of the UE finds that some services exist before the handover of the UE, or the target secondary eNB of the UE receives request about the same service of the same UE transmitted by other eNBs, the target secondary eNB of the UE configures no resource for the services any longer after the handover of the UE, thereby avoiding repeated reservation of resources.

With the method of this embodiment, during the cell handover, the source primary eNB of the UE transmits the identification indication information or the service indication information of the UE in the serving eNB before handover to the serving eNB after the handover, hence the serving eNB after the handover may allocate appropriate resources for the services of the UE, thereby avoiding repeated reservation of resources, and improving resource utilization ratio.

Embodiment 4

Figure 6:
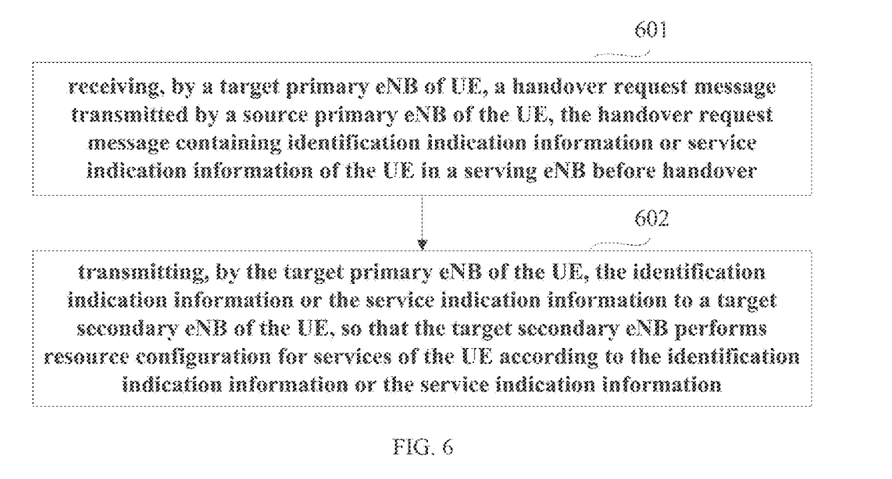
FIG. 6 is a flowchart of another implementation of the network configuration method of the embodiment of the present disclosure.

An embodiment of the present disclosure further provides a cell handover method. FIG. 6 is a flowchart of the method. Referring to FIG. 6, the method includes:

step 601: receiving, by a target primary eNB of UE, a handover request message transmitted by a source primary eNB of the UE, the handover request message containing identification indication information or service indication information of the UE in a serving eNB before handover; and step 602: transmitting, by the target primary eNB of the UE, the identification indication information or the service indication information to a target secondary eNB of the UE, so that the target secondary eNB performs resource configuration for services of the UE according to the identification indication information or the service indication information.

In this embodiment, the identification indication information or the service indication information of the UE in the serving eNB before the handover has been described in detail in Embodiment 3, the contents of which being incorporated herein, which shall not be described herein any further.

With the method of this embodiment, the target primary eNB of the UE transmits the identification indication information or the service indication information of the UE in the serving eNB before handover to the target secondary eNB of the UE, hence the target secondary eNB may refer to the information in allocating resources for the services of the UE, thereby avoiding repeated configuration of resources.

In this embodiment, alternatively, similar to Embodiment 1, in an implementation, the target primary eNB of the UE may further generate an identifier of the UE in a service mode of the target primary eNB and the target secondary eNB, and transmit the identifier to the target secondary eNB of the UE. After receiving the identifier, the target secondary eNB saves it for performing subsequent management on the UE; in another implementation, the target secondary eNB of the UE generates an identifier of the UE in a service mode of the target primary eNB and the target secondary eNB, and transmits the identifier to the target primary eNB of the UE. After receiving the identifier, the target primary eNB saves it for performing subsequent management on the UE; in a further implementation, both the target primary eNB and the target secondary eNB of the UE generate identifiers of the UE in the service mode of the target primary eNB and the target secondary eNB, and interact the respectively generated identifiers. Alternatively, when the target primary eNB of the UE generates the identifier and transmits it to the target secondary eNB of the UE, the identifier may be carried in a response message and be transmitted by the target secondary eNB of the UE to the target primary eNB of the UE, so that the target primary eNB performs subsequent management on the UE accordingly.

With the method of this embodiment, the target primary eNB of the UE not only transmits the identification indication information or the service indication information of the UE in the serving eNB before handover to the target secondary eNB, but also transmits the identifier of the UE in the joint service mode of the target primary eNB and the target secondary eNB to the target secondary eNB. Hence, not only the target secondary eNB may configure a corresponding resource for the service requested by the UE accordingly, but also one UE being served by multiple eNBs simultaneously and being managed by multiple eNBs jointly may be achieved, thereby avoiding waste of resources, and improving resource utilization ratio.

In this embodiment, corresponding to the scenario shown in FIG. 4A and the scenario shown in FIG. 4B, the primary eNB 2 not only transmits the identification indication information or the service indication information acquired from the primary eNB 1 to the secondary eNB, but also transmits the identifier of the UE in the joint service mode of the primary eNB 2 and the secondary eNB to the secondary eNB.

In this embodiment, corresponding to the scenario shown in FIG. 4C, the primary eNB 2 not only transmits the identification indication information or the service indication information acquired from the primary eNB 1 to the secondary eNB, but also transmits the identifier of the UE in the joint service mode of the primary eNB 2 and the secondary eNB 2 to the secondary eNB.

In this embodiment, identical to Embodiment 1, a form of the identifier of the UE in the joint service mode of the target primary eNB (the primary eNB 2) and the target secondary eNB (the secondary eNB or the secondary eNB 2) is as described above, which may be any one of the following identifiers or a combination thereof:

an identifier of UE;
an identifier of a target primary eNB;
an identifier of a target secondary eNB;
an identifier of the UE in the target primary eNB; and
an identifier of the UE in the target secondary eNB.

In this embodiment, the identification indication information and the service indication information of the UE in the serving eNB before handover may be carried by an addition request message; however, this embodiment is not limited thereto. Furthermore, if the target primary eNB of the UE generates the identifier of the UE in the service mode of the target primary eNB and the target secondary eNB, the identifier may be, together with the above identification indication information or service indication information, carried by an addition request message; if the target secondary eNB of the UE generates the identifier of the UE in the service mode of the target primary eNB and the target secondary eNB, the identifier may be carried by an addition request response message; and if both the target primary eNB and the target secondary eNB of the UE generate the identifiers of the UE in the service mode of the target primary eNB and the target secondary eNB, the identifier generated by the target primary eNB may be, together with the above identification indication information or service indication information, carried by the addition request message, and the identifier generated by the target secondary eNB may be carried by the addition request response message.

With the method of this embodiment, the target primary eNB of the UE transmits the identification indication information or the service indication information of the UE in the serving eNB before handover acquired from the source primary eNB to the target secondary eNB. Hence, the target secondary eNB may configure a resource for the service requested by the UE with reference to the above received information, thereby avoiding waste of resources resulted from repeated reservation of resources.

Embodiment 5

Figure 7:
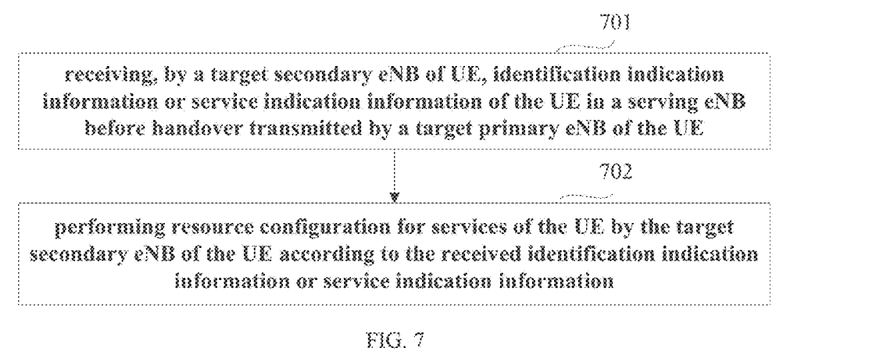
FIG. 7 is a flowchart of a further implementation of the network configuration method of the embodiment of the present disclosure.

An embodiment of the present disclosure further provides a network configuration method. FIG. 7 is a flowchart of the method. Referring to FIG. 7, the method includes:

step 701: receiving, by a target secondary eNB of UE, identification indication information or service indication information of the UE in a serving eNB before handover transmitted by a target primary eNB of the UE; and step 702: performing resource configuration for services of the UE by the target secondary eNB of the UE according to the received identification indication information or service indication information.

In this embodiment, contents of the identification indication information or service indication information of the UE in a serving eNB before handover have been described in detail in Embodiment 3, the contents of which being incorporated herein, and being not going to be described herein any further.

In this embodiment, alternatively, if the target primary eNB of the UE generates the identifier of the UE in the service mode of the target primary eNB and the target secondary eNB, the target secondary eNB of the UE may further receive the identifier and store it for performing subsequent management on the UE. In this embodiment, the identifier generated by the target primary eNB of the UE may be, together with the above identification indication information or service indication information, transmitted to the target secondary eNB of the UE via an addition request message, and the target secondary eNB of the UE may further transmit an addition request response message to the target primary eNB of the UE. And in the response message, information on the above identification may not be contained, and the above received identifier generated by the target primary eNB may be contained.

In this embodiment, alternatively, if the target secondary eNB of the UE generates the identifier of the UE in the service mode of the target primary eNB and the target secondary eNB, the target secondary eNB of the UE transmits the generated identifier to the target primary eNB of the UE via a response message after receiving the above identification indication information or service indication information, so that the target primary eNB of the UE stores it for performing subsequent management on the UE. In this embodiment, the identification indication information or service indication information may be carried by an addition request message, and the above response message may be an addition request response message.

In this embodiment, alternatively, if both the target primary eNB and the target secondary eNB of the UE generate identifiers of the UE in the service mode of the target primary eNB and the target secondary eNB, the target primary eNB and the target secondary eNB may further interact the respectively generated identifiers for performing subsequent management on the UE respectively. In this embodiment, the identifier generated by the target primary eNB may be, together with the above identification indication information or service indication information, carried by an addition request message, and the identifier generated by the target secondary eNB may be carried by an addition request response message.

With the method of this embodiment, after receiving the above information (the identification indication information or the service indication information), the target secondary eNB of the UE, by inquiring services requested by the UE, determines whether the secondary eNB has provided the UE with an identical service, or whether the service for the UE exists, or whether a request of the UE for the service is received from another eNB, when the UE is in the joint service mode of the source primary eNB and the source secondary eNB before handover, and does not reserve resources for the services of the UE if it is determined yes, thereby avoiding waste of resources.

For the methods of embodiments 3-5 to be more clear and easy to be understood, the methods of these embodiments shall be described with reference to flowcharts of interaction between the source primary eNB (the primary eNB 1), the target primary eNB (the primary eNB 2) and the target secondary eNB (corresponding to the secondary eNB in the scenarios shown in FIGS. 4A and 4B and the secondary eNB 2 in the scenario shown in FIG. 4C) of the UE.

Figure 8:
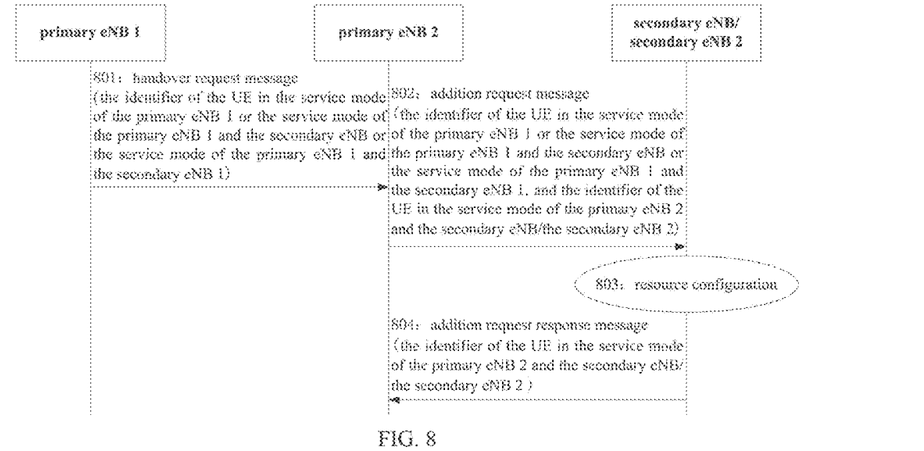
FIG. 8 is a schematic diagram of an implementation of interaction between a source primary eNB, a target primary eNB and a target secondary eNB under the network configuration method of the embodiment of the present disclosure.

FIG. 8 is a schematic diagram of interaction in a process of cell handover, in which the source primary eNB of the UE transmits the identification indication information of the UE in the serving eNB before handover to the target primary eNB to assist the target secondary eNB in performing resource configuration for services requested by the UE.

Referring to FIG. 8, the process includes:

step 801: transmitting a handover request message by the primary eNB 1 to the primary eNB 2, the handover request message containing the identifier of the UE in the service mode of the primary eNB 1 or the service mode of the primary eNB 1 and the secondary eNB or the service mode of the primary eNB 1 and the secondary eNB 1;

in this embodiment, processing of the primary eNB 1 may be carried out by using the method of Embodiment 3, the contents of which being incorporated herein, and being not going to be described herein any further;

step 802: receiving the identifier by the primary eNB 2, and transmitting the identifier and the identifier of the UE in the service mode of the primary eNB 2 and the secondary eNB/the secondary eNB 2 by the primary eNB 2 to the secondary eNB/the secondary eNB 2;

in this embodiment, processing of the primary eNB 2 may be carried out by using the method of Embodiment 4, the contents of which being incorporated herein, and being not going to be described herein any further;

in this embodiment, the identifier of the UE in the service mode of the primary eNB 2 and the secondary eNB/the secondary eNB 2 is optional; and in an implementation, the primary eNB 2 does not generate the identifier, and at this moment, the primary eNB 2 does not transmit the identifier to the secondary eNB/the secondary eNB 2;

in this embodiment, the above identifier may be carried by an addition request message; however, this embodiment is not limited thereto;

step 803: performing resource configuration for the services of the UE by the secondary eNB/the secondary eNB 2 according to the received information;

in this embodiment, processing of the secondary eNB/the secondary eNB 2 may be carried out by using the method of Embodiment 5, the contents of which being incorporated herein, and being not going to be described herein any further;

in this embodiment, in performing resource configuration for the services of the UE, the secondary eNB/the secondary eNB 2 determines whether resources have been reserved for the services of the UE according to the above information; and if yes, the secondary eNB/the secondary eNB 2 allocates no resource for the UE any longer; otherwise, the secondary eNB/the secondary eNB 2 performs resource allocation for the services of the UE by conventional means, thereby avoiding repeated reservation of resources;

step 804: transmitting by the secondary eNB/the secondary eNB 2 to the primary eNB 2, the identifier of the UE in the joint service mode of the primary eNB 2 and the secondary eNB/the secondary eNB 2 generated by the secondary eNB/the secondary eNB 2;

in this embodiment, the above identifier may be carried by an addition request response message; however, this embodiment is not limited thereto;

and in this embodiment, the identifier of the UE in the joint service mode of the primary eNB 2 and the secondary eNB/the secondary eNB 2 is also optional; and in an implementation, the secondary eNB/the secondary eNB 2 does not generate the identifier of the UE in the joint service mode of the primary eNB 2 and the secondary eNB/the secondary eNB 2, and at this moment, the response message transmitted to the primary eNB 2 by the secondary eNB/the secondary eNB 2 does not contain information on the identifier, or contains the identifier of the UE in the joint service mode of the primary eNB 2 and the secondary eNB/the secondary eNB 2 generated by the primary eNB 2.

It can be seen from the operational processes of the eNBs shown in FIG. 8 that with the method of this embodiment, reserving multiple resources for the same service of the UE may be avoided, waste of resource is avoided, and a utilization ratio of resources is improved.

Figure 9:
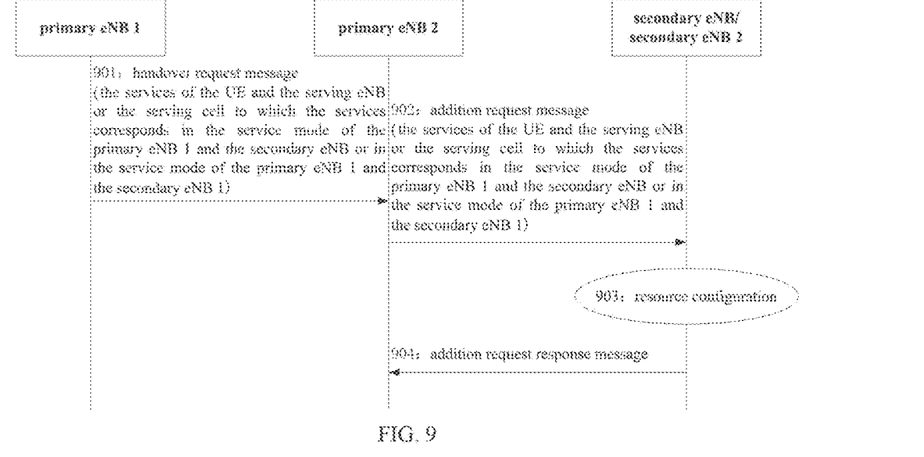
FIG. 9 is a schematic diagram of another implementation of interaction between the source primary eNB, the target primary eNB and the target secondary eNB under the network configuration method of the embodiment of the present disclosure.

FIG. 9 is a schematic diagram of interaction in a process of cell handover, in which the source primary eNB of the UE transmits services of the UE in the serving eNB before handover and a serving eNB or a serving cell to which the service corresponds (service indication information) to the target primary eNB to assist the target secondary eNB in performing resource configuration for the service requested by the UE.

Referring to FIG. 9, the process includes:

step 901: transmitting a handover request message by the primary eNB 1 to the primary eNB 2, the handover request message containing the services of the UE and the serving eNB or the serving cell to which the services corresponds in the service mode of the primary eNB 1 and the secondary eNB or in the service mode of the primary eNB 1 and the secondary eNB 1;

in this embodiment, processing of the primary eNB 1 may be carried out by using the method of Embodiment 3, the contents of which being incorporated herein, and being not going to be described herein any further;

step 902: transmitting the above received information by the primary eNB 2 to the secondary eNB/the secondary eNB 2;

in this embodiment, processing of the primary eNB 2 may be carried out by using the method of Embodiment 4, the contents of which being incorporated herein, and being not going to be described herein any further;

in this embodiment, alternatively, if the primary eNB generates the identifier of the UE in the service mode of the primary eNB 2 and the secondary eNB/the secondary eNB 2, the primary eNB 2 may transmit the identifier of the UE in the service mode of the primary eNB 2 and the secondary eNB/the secondary eNB 2 generated by itself, together with the above information, to the secondary eNB/the secondary eNB 2;

in this embodiment, the above information may be carried by an addition request message; however, this embodiment is not limited thereto;

step 903: performing resource configuration for the services of the UE by the secondary eNB/the secondary eNB 2 according to the received information;

in this embodiment, after receiving the above information, if the secondary eNB/the secondary eNB 2 finds that the service of the UE exists, or the secondary eNB/the secondary eNB 2 receives a request from another eNB for the same service of the same UE, the secondary eNB/the secondary eNB 2 may avoid reserving doubled resources for the same service of the same UE;

step 904: transmitting the response message by the secondary eNB/the secondary eNB 2 to the primary eNB 2;

in this embodiment, alternatively, if the secondary eNB/the secondary eNB 2 generates the identifier of the UE in the service mode of the primary eNB 2 and the secondary eNB/the secondary eNB 2, the secondary eNB/the secondary eNB 2 may transmit the identifier of the UE in the service mode of the primary eNB 2 and the secondary eNB/the secondary eNB 2 generated by itself to the primary eNB 2;

in this embodiment, alternatively, if the secondary eNB/the secondary eNB 2 does not generate the identifier of the UE in the service mode of the primary eNB 2 and the secondary eNB/the secondary eNB 2, but receives the identifier of the UE in the service mode of the primary eNB 2 and the secondary eNB/the secondary eNB 2 generated and transmitted by the primary eNB 2, the secondary eNB/the secondary eNB 2 may also transmit the identifier of the UE in the service mode of the primary eNB 2 and the secondary eNB/the secondary eNB 2 generated by the primary eNB 2 to the primary eNB 2 via the response message, or transmit only the response message, containing no information on the identifier;

in this embodiment, the response message may be an addition request response message; however, this embodiment is not limited thereto.

It can be seen from the operational processes of the eNBs shown in FIG. 9 that with the method of this embodiment, reserving multiple resources for the same service of the UE may be avoided, waste of resource is avoided, and a utilization ratio of resources is improved.

An embodiment of the present disclosure further provides an eNB, as described in Embodiment 6 below. As principles of the eNB for solving problems are similar to that of the method of Embodiment 3, the implementation of the method of Embodiment 3 may be referred to for implementation of the eNB, with identical contents being not going to be described herein any further.

Embodiment 6

Figure 10:
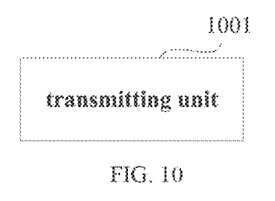
FIG. 10 is a schematic diagram of a structure of the source primary eNB corresponding to the embodiment shown in FIG. 5.

An embodiment of the present disclosure further provides an eNB. FIG. 10 is a schematic diagram of a structure of the eNB. As shown in FIG. 10, the eNB includes:

a transmitting unit 1001 configured to transmit a handover request message to a target primary eNB of UE, the handover request message containing identification indication information or service indication information of the UE in a serving eNB before handover, so that the target primary eNB forwards the identification indication information or the service indication information to a target secondary eNB, so that the target secondary eNB performs resource configuration for services of the UE with reference to the identification indication information or the service indication information.

In this embodiment, the identification indication information of the UE in the serving eNB before handover includes: an identifier of the UE, and/or an identifier of the UE in the source primary eNB, and/or an identifier of the UE in a source secondary eNB, and/or an identifier of the source primary eNB, and/or an identifier of the source secondary eNB.

In this embodiment, the service indication information includes: services of the UE, and a serving eNB or a serving cell to which the services correspond.

The eNB of this embodiment transmits the identification indication information or service indication information of the UE in the serving eNB before handover to the target serving eNB, so that the secondary eNB in the target serving eNB allocates a resource for the services of the UE accordingly, thereby avoiding waste of resources.

An embodiment of the present disclosure further provides an eNB, as described in Embodiment 7 below. As principles of the eNB for solving problems are similar to that of the method of Embodiment 4, the implementation of the method of Embodiment 4 may be referred to for implementation of the eNB, with identical contents being not going to be described herein any further.

Embodiment 7

Figure 11:
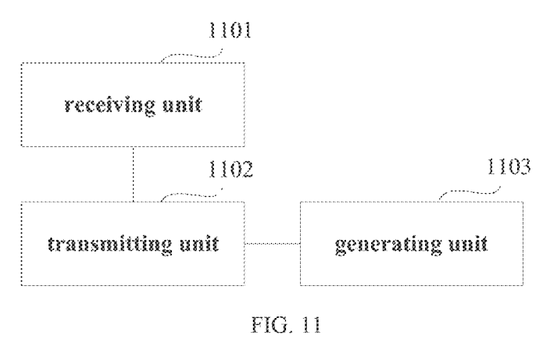
FIG. 11 is a schematic diagram of a structure of the target primary eNB corresponding to the embodiment shown in FIG. 6.

An embodiment of the present disclosure further provides an eNB. FIG. 11 is a schematic diagram of a structure of the eNB. As shown in FIG. 11, the eNB includes:

a receiving unit 1101 configured to receive a handover request message transmitted by a source primary eNB of UE, the handover request message containing identification indication information or service indication information of the UE in a serving eNB before handover; and a transmitting unit 1102 configured to transmit the identification indication information or the service indication information to a target secondary eNB of the UE, so that the target secondary eNB performs resource configuration for services of the UE according to the identification indication information or the service indication information.

In an implementation, the eNB further includes: a generating unit 1103 configured to generate an identifier of the UE in a joint service mode of the eNB and the target secondary eNB; and at this moment, the transmitting unit 1102 transmits the identifier of the UE in the service mode of the eNB and the target secondary eNB, together with the identification indication information or the service indication information, to the target secondary eNB of the UE.

In another implementation, the receiving unit 1101 is further configured to receive an identifier of the UE in a joint service mode of the eNB and the target secondary eNB transmitted by the target secondary eNB of the UE. In this embodiment, the identifier of the UE in the service mode of the eNB and the target eNB may be generated by the target secondary eNB, and may also be generated by the eNB and received by the target secondary eNB from the eNB.

In this embodiment, the identifier of the UE in the joint service mode of the eNB and the target secondary eNB includes: an identifier of the UE, and/or an identifier of the eNB, and/or an identifier of the target secondary eNB, and/or an identifier of the UE in the eNB, and/or an identifier of the UE in the target secondary eNB.

The eNB of this embodiment transmits the identification indication information or service indication information of the UE in the serving eNB before handover to the target secondary eNB, so that the target secondary eNB allocates a resource for the services of the UE accordingly, thereby avoiding waste of resources.

An embodiment of the present disclosure further provides an eNB, as described in Embodiment 8 below. As principles of the eNB for solving problems are similar to that of the method of Embodiment 5, the implementation of the method of Embodiment 5 may be referred to for implementation of the eNB, with identical contents being not going to be described herein any further.

Embodiment 8

Figure 12:
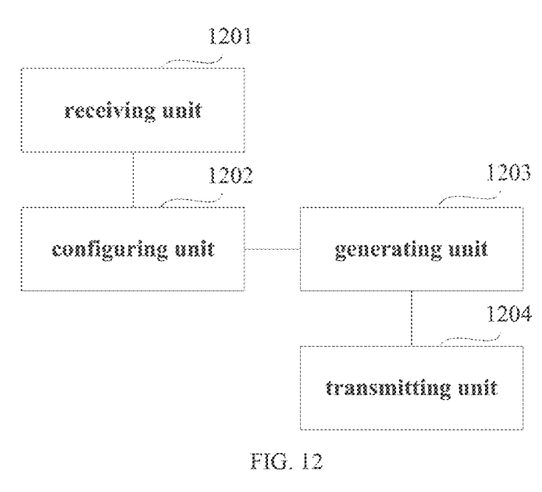
FIG. 12 is a schematic diagram of a structure of the target secondary eNB corresponding to the embodiment shown in FIG. 7.

An embodiment of the present disclosure further provides an eNB. FIG. 12 is a schematic diagram of a structure of the eNB. As shown in FIG. 12, the eNB includes:

a receiving unit 1201 configured to receive identification indication information or service indication information of UE in a serving eNB before handover transmitted by a target primary eNB of the UE; and a configuring unit 1202 configured to perform resource configuration for services of the UE according to the identification indication information or service indication information.

In an implementation of this embodiment, the eNB further includes:

a generating unit 1203 configured to generate an identifier of the UE in a joint service mode of the target primary eNB and the eNB; and a transmitting unit 1204 configured to transmit to the target primary eNB of the UE the identifier of the UE in the joint service mode of the target primary eNB and the eNB.

The eNB of this embodiment allocates a resource for the services of the UE according to the identification indication information or service indication information of the UE in the serving eNB before handover, thereby avoiding waste of resources.

An embodiment of the present disclosure further provides a communication system, including at least two eNBs as described in Embodiment 2, or including the eNBs as described in embodiments 6, 7 and 8.

An embodiment of the present disclosure further provides a computer-readable program, wherein when the program is executed in an eNB, the program enables a computer to carry out the cell handover method as described in any one of embodiments 3-5, or the network configuration method as described in Embodiment 1, in the eNB.

An embodiment of the present disclosure further provides a storage medium in which a computer-readable program is stored, wherein the computer-readable program enables a computer to carry out the cell handover method as described in any one of embodiments 3-5, or the network configuration method as described in Embodiment 1, in an eNB.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

What is claimed is:

1. A network configuration method, comprising:
receiving, by a target primary eNB of user equipment, a handover request message transmitted by a source primary eNB of the user equipment, the handover request message containing service indication information of the user equipment in a serving eNB before handover,
transmitting, by the target primary eNB of the user equipment, the service indication information to a target secondary eNB of the user equipment,
wherein the service indication information comprises: services of the user equipment in a service mode of the source primary eNB and a source secondary eNB; and a serving eNB or a serving cell to which the services correspond.

2. The method according to claim 1, wherein, the target secondary eNB performs resource configuration for services of the user equipment according to the service indication information.

3. A network configuration method, comprising:
transmitting, by a source primary eNB of user equipment, a handover request message to a target primary eNB of the user equipment, the handover request message containing service indication information of the user equipment in a serving eNB before handover,
wherein the service indication information comprises: services of the user equipment in a service mode of the source primary eNB and a source secondary eNB; and a serving eNB or a serving cell to which the services correspond, and
wherein the target primary eNB forwards the service indication information to a target secondary eNB of the user equipment.

4. The method according to claim 3, wherein, the target secondary eNB of the user equipment performs resource configuration for services of the user equipment with reference to the service indication information.

5. An eNB, comprising:
a memory that stores a plurality of instructions; and
a processor coupled to the memory and configured to execute the instructions to:
receive a handover request message transmitted by a source primary eNB of user equipment, the handover request message containing service indication information of the user equipment in a serving eNB before handover, and
transmit the service indication information to a target secondary eNB of the user equipment,
wherein the service indication information comprises: services of the user equipment in a service mode of the source primary eNB and a source secondary eNB; and a serving eNB or a serving cell to which the services correspond.

6. The eNB according to claim 5, wherein, the target secondary eNB performs resource configuration for services of the user equipment according to the service indication information.

7. The eNB according to claim 5, wherein the processor is further configured to execute the instructions to:
   generate an identifier of the user equipment in a joint service mode of the eNB and a target secondary eNB; and transmit the identifier of the user equipment in the joint service mode of the eNB and the target secondary eNB generated by the eNB to the target secondary eNB.

8. The eNB according to claim 7, wherein the identifier of the user equipment in the joint service mode of the eNB and the target secondary eNB comprises: an identifier of the user equipment, and/or an identifier of the eNB, and/or an identifier of the target secondary eNB, and/or an identifier of the user equipment in the eNB, and/or an identifier of the user equipment in the target secondary eNB.

9. The eNB according to claim 5, wherein the processor is further configured to execute the instructions to:
   receive an identifier of the user equipment in a joint service mode of the eNB and a target secondary eNB transmitted by the target secondary eNB of the user equipment.

10. The eNB according to claim 9, wherein the identifier of the user equipment in the joint service mode of the eNB and the target secondary eNB comprises: an identifier of the user equipment, and/or an identifier of the eNB, and/or an identifier of the target secondary eNB, and/or an identifier of the user equipment in the eNB, and/or an identifier of the user equipment in the target secondary eNB.

11. An eNB as a target secondary eNB, comprising:
   a memory that stores a plurality of instructions;
   a processor coupled to the memory and configured to execute the instructions to:
   receive, from a target primary eNB, service indication information of user equipment in a service mode of a source primary eNB and a source secondary eNB before handover transmitted by the target primary eNB of the user equipment; and
   perform resource configuration for services of the user equipment according to the received service indication information,
   wherein the service indication information comprises: services of the user equipment in a service mode of the source primary eNB and the source secondary eNB; and a serving eNB or a serving cell to which the services correspond.

12. The eNB according to claim 11, wherein the processor is further configured to execute the instructions to:
   generate an identifier of the user equipment in a joint service mode of the target primary eNB and the eNB; and
   transmit the identifier of the user equipment in the joint service mode of the target primary eNB and the eNB generated by the eNB to the target primary eNB of the user equipment.

13. The eNB according to claim 11, wherein the processor is further configured to execute the instructions to receive an identifier of the user equipment in a joint service mode of the target primary eNB and the eNB generated by the target primary eNB and transmitted by the target primary eNB.

14. The eNB according to claim 13, wherein the processor is further configured to execute the instructions to:
   transmit the identifier of the user equipment in the joint service mode of the target primary eNB and the eNB generated by the target primary eNB and receive by the eNB to the target primary eNB of the user equipment.

15. An eNB, comprising:
   a memory that stores a plurality of instructions;
   a processor coupled to the memory and configured to execute the instructions to:
   transmit a handover request message to a target primary eNB of user equipment, the handover request message containing service indication information of the user equipment in a serving eNB before handover,
   wherein the service indication information comprises: services of the user equipment in a joint service mode of the eNB and a source secondary eNB; and a serving eNB or a serving cell to which the services correspond, and
   wherein, the target primary eNB forwards the service indication information to a target secondary eNB of the user equipment.

16. The eNB according to claim 15, wherein, the target secondary eNB of the user equipment performs resource configuration for services of the user equipment with reference to the service indication information.

* * * * *